(12) United States Patent
Zwisler et al.

(10) Patent No.: US 8,055,815 B2
(45) Date of Patent: Nov. 8, 2011

(54) OPTIMAL PATHS WITH SCSI I/O REFERRALS

(75) Inventors: Ross E. Zwisler, Lafayette, CO (US);
Andrew J. Spry, Wichita, KS (US);
Gerald J. Fredin, Wichita, KS (US);
Kenneth J. Gibson, Lafayette, CO (US)

(73) Assignee: LSI Corporation, Milpitas, CA (US)

( * ) Notice: Subject to any disclaimer, the term of this patent is extended or adjusted under 35 U.S.C. 154(b) by 370 days.

(21) Appl. No.: 12/386,410

(22) Filed: Apr. 16, 2009

(65) Prior Publication Data
US 2010/0269124 A1 Oct. 21, 2010

(51) Int. Cl.
*G06F 3/00* (2006.01)
*G06F 13/00* (2006.01)
*G06F 15/173* (2006.01)
(52) U.S. Cl. ............ 710/38; 710/31; 711/100; 709/238
(58) Field of Classification Search ................ None
See application file for complete search history.

(56) References Cited

U.S. PATENT DOCUMENTS

| 2007/0244908 A1* | 10/2007 | Rajan ................ 707/10 |
| 2008/0244174 A1* | 10/2008 | Abouelwafa et al. ...... 711/114 |

* cited by examiner

*Primary Examiner* — Alan Chen
(74) *Attorney, Agent, or Firm* — Suiter Swantz pc llo

(57) ABSTRACT

The present disclosure is directed to a method for communication between an initiator system and a block storage cluster. The method may comprise receiving an initial data request from the initiator system to a first storage system, a portion of the data requested in the initial data request is not stored by the first storage system, but is stored by a second storage system; retrieving the portion of the data that is stored by the second storage system; forwarding the portion of the data to the initiator system; and transmitting a referral list comprising at least one referral from the first storage system to the initiator system, wherein the initiator system is configured for maintaining a referral cache based on the referral list, and a subsequent data request initiated by the initiator system is directed to the block storage cluster based on the referral cache.

20 Claims, 4 Drawing Sheets

| Type | Port | Offset | Length |
|---|---|---|---|
| Type $T_0$ | Port $P_0$ | LBA $O_0$ | Length $L_0$ |
| Type $T_1$ | Port $P_1$ | LBA $O_1$ | Length $L_1$ |
| ⋮ | ⋮ | ⋮ | ⋮ |
| Type $T_N$ | Port $P_N$ | LBA $O_N$ | Length $L_N$ |

*FIG. 2*

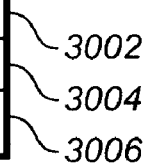

| Type | Port | Offset | Length | |
|---|---|---|---|---|
| Soft Referral | Port 1 | LBA 100 | 100 Blocks | 3002 |
| Soft Referral | Port 2 | LBA 200 | 100 Blocks | 3004 |
| Soft Referral | Port 3 | LBA 300 | 100 Blocks | 3006 |

*FIG. 3*

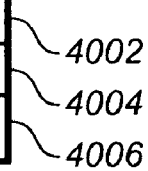

| Type | Port | Offset | Length | |
|---|---|---|---|---|
| Soft Referral | Port 1 | LBA 100 | 100 Blocks | 4002 |
| Soft Referral | Port 2 | LBA 200 | 100 Blocks | 4004 |
| Hard Referral | Port 3 | LBA 300 | 100 Blocks | 4006 |

*FIG. 4*

OPTIMAL PATHS WITH SCSI I/O REFERRALS

FIELD OF THE INVENTION

The present invention relates to the field of electronic data storage and particularly to a system and method for providing referrals for Small Computer System Interface (SCSI) Input/Output (I/O) referrals.

BACKGROUND OF THE INVENTION

Small Computer System Interface (SCSI) Input/Output (I/O) referral techniques may be utilized to facilitate communication between an initiator system and a block storage cluster. For example, the initiator system (e.g., a data requester) may transmit a data request command to a first storage system of the block storage cluster. If the data requested is stored in the first storage system, the data may be retrieved and transferred to the initiator system. If a portion of the data requested is not stored by the first storage system, but is stored by a second storage system of the block storage cluster, scale-out techniques such as data forwarding may be utilized for accessing data stored by the second storage system. However, data forwarding penalties may be associated with such forwarding techniques.

Therefore, it may be desirable to provide a storage system which addresses the above-referenced problems of currently available storage system solutions.

SUMMARY OF THE INVENTION

Accordingly, an embodiment of the present invention is directed to a method for communication between an initiator system and a block storage cluster. The method may comprise receiving an initial data request transmitted from the initiator system to a first storage system included in a plurality of storage systems of the block storage cluster, a portion of the data requested in the initial data request is not stored by the first storage system, but is stored by a second storage system included in the plurality of storage systems of the block storage cluster; retrieving utilizing the first storage system the portion of the data that is stored by the second storage system; forwarding the portion of the data retrieved by the first storage system to the initiator system; and transmitting a referral list comprising at least one referral from the first storage system to the initiator system, the at least one referral providing information for an optimal path for retrieving the portion of the data that is stored by the second storage system, wherein the initiator system is configured for maintaining a referral cache based on the referral list, and a subsequent data request initiated by the initiator system is directed to the block storage cluster based on the referral cache.

A further embodiment of the present invention is directed to a storage system. The storage system may comprise means for receiving an initial data request transmitted from the initiator system to a first storage system included in a plurality of storage systems of the block storage cluster, a portion of the data requested in the initial data request is not stored by the first storage system, but is stored by a second storage system included in the plurality of storage systems of the block storage cluster; means for retrieving utilizing the first storage system the portion of the data that is stored by the second storage system; means for forwarding the portion of the data retrieved by the first storage system to the initiator system; and means for transmitting a referral list comprising at least one referral from the first storage system to the initiator system, the at least one referral providing information for an optimal path for retrieving the portion of the data that is stored by the second storage system, wherein the initiator system is configured for maintaining a referral cache based on the referral list, and a subsequent data request initiated by the initiator system is directed to the block storage cluster based on the referral cache.

An additional embodiment of the present invention is directed to a computer-readable medium having computer-executable instructions for performing a method for communication between an initiator system and a block storage cluster. The method may comprise receiving an initial data request transmitted from the initiator system to a first storage system included in a plurality of storage systems of the block storage cluster, a portion of the data requested in the initial data request is not stored by the first storage system, but is stored by a second storage system included in the plurality of storage systems of the block storage cluster; retrieving utilizing the first storage system the portion of the data that is stored by the second storage system; forwarding the portion of the data retrieved by the first storage system to the initiator system; and transmitting a referral list comprising at least one referral from the first storage system to the initiator system, the at least one referral providing information for an optimal path for retrieving the portion of the data that is stored by the second storage system, wherein the initiator system is configured for maintaining a referral cache based on the referral list, and a subsequent data request initiated by the initiator system is directed to the block storage cluster based on the referral cache.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 2 is an illustration of a referral list;

FIG. 3 is an illustration depicting a referral list containing referrals;

FIG. 4 is an illustration depicting another referral list containing referrals;

DETAILED DESCRIPTION OF THE INVENTION

Reference will now be made in detail to the presently preferred embodiments of the invention, examples of which are illustrated in the accompanying drawings.

Figure 1:
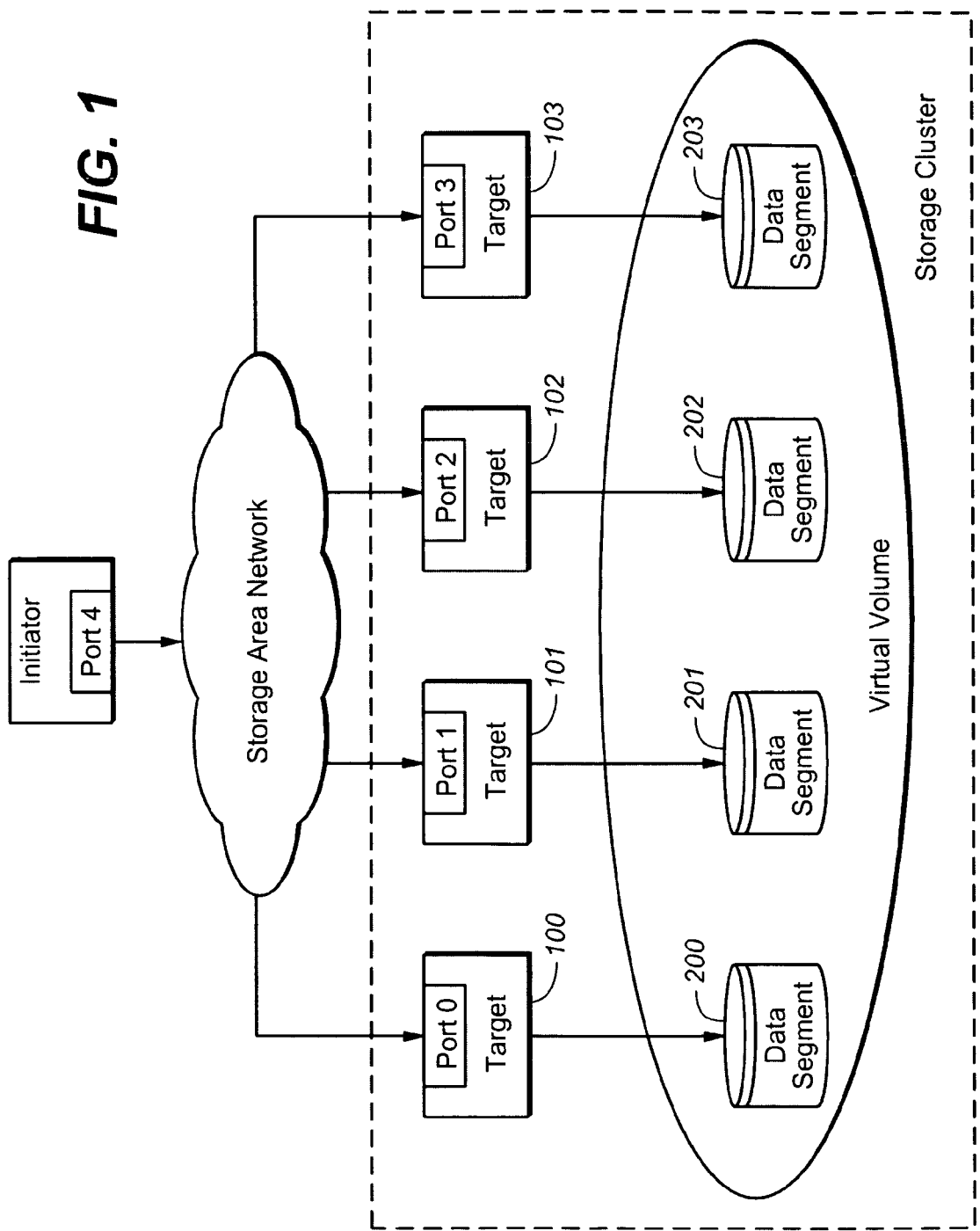
FIG. 1 is a networked storage implementation/system accessible via a block storage protocol in accordance with an exemplary embodiment of the present invention.

Referring to FIG. 1, a networked storage implementation/system accessible via a block storage protocol in accordance with an exemplary embodiment of the present disclosure is shown. An initiator system may be configured for accessing a block storage cluster via a storage area network. The target devices may be disks, storage arrays, tape libraries, and/or other types of storage devices. The initiator system may issue I/O requests. An I/O request may be a SCSI command.

Small Computer System Interface (SCSI) Input/Output (I/O) may be utilized to facilitate communication between an initiator system and a block storage cluster. The SCSI command may identify the requested data by a starting address of the data and a length of the data in a volume logical block address space. For example, the initiator system (e.g., a data requester) may transmit a data request command to a first storage system (e.g., target 100 through port 0) included in a plurality of storage systems of the block storage cluster. When the data requested in the data request is stored in the first storage system, the data may be retrieved and transferred to the initiator system. However, when a portion of the data requested is not stored by the first storage system, but is stored by a second storage system (e.g., target 101) included in the block storage cluster, scale-out techniques such as data forwarding may be utilized for accessing data stored by the second storage system.

Target side scale-out techniques such as data forwarding may allow an initiator system to access data on Logical Unit Numbers (LUNs) that are spread across a plurality of target devices. Utilizing such techniques, all virtual volume data may be accessed from any port on any target device in the cluster. However, if data is accessed from a port on a target device which does not contain the data, a data forwarding penalty may be incurred while the target device retrieves the requested data.

Alternatively, when a portion of the data requested is not stored by the first storage system, a referral response may be transmitted from the first storage system to the initiator system. The referral response may provide an indication to the initiator system that not all of the requested data was transferred. The referral response may further provide information for directing the initiator system to the second storage system (e.g., accessing target 101 through port 1). This approach, however, may not provide the flexibility as provided in the data forwarding approach described above, where data may be accessible from any of the storage systems.

The present disclosure is directed to a method for communication between an initiator system and a block storage cluster. Target side scale-out techniques such as data forwarding may be utilized when a portion of the data requested is not stored by the storage system processing the request, but by another storage system in the storage cluster. In addition, referrals may be provided to inform the initiator system of an optimal path for accessing data stored by the other storage system. The initiator may cache the referral information provided, and utilize the referral cache to assist routing of subsequent I/O requests. The initiator may also split I/O requests that span multiple data segments when necessary based on the referral information. Therefore, the method of the present disclosure may enable every node in the storage cluster to service every I/O request without the need for any forced I/O redirects. In addition, the referral path data may enable the initiator to correctly route subsequent I/O requests without incurring data forwarding penalties.

In one embodiment, when data forwarding is utilized for a given I/O request, the storage system handling the I/O request may inform the initiator about optimal paths to the underlying data segments by returning a list of referrals after all data transfers have successfully finished. A referral list may be generated for each I/O request that triggers data forwarding. The referral list may inform the initiator that although the storage system was able to successfully complete the I/O, future I/O operations to the data segment should be directed elsewhere (e.g., to a particular storage system that actually stores the requested data) for optimal performance.

In the illustrated configuration shown in FIG. 1, the block storage cluster's virtual volume may comprise data segments 200, 201, 202 and 203. These data segments may be accessible through ports 0, 1, 2 and 3, respectively. If each of these data segments has a length of 100 blocks, the resulting virtual volume may have a length of 400 blocks.

In one example, consider a case where an initial data request to LBA 0 for 400 blocks is sent to Port 0. The four data segments 200, 201, 202 and 203 each may contain 100 blocks of data. Utilizing data forwarding, Target Device 100 may be able to retrieve the requested data from other data segments, and service the initial data request even though the request spans all four data segments.

In one embodiment, in addition to providing data requested by the initial data request, a referral list may be generated and provided to the initiator system. A referral list may be provided for each data request where a portion of the requested data is stored by another storage device different from the storage device receiving the data request. Referring to FIG. 2, a referral list containing a plurality of referrals is shown. In one embodiment, each referral may comprise a port indicator, an offset logical block address (LBA) and a data block length. The port indicator may indicate a port to be utilized for communication between the initiator system and a particular storage device. The offset LBA may indicate the LBA of the portion of the data that is stored by the particular storage device. The data block length may indicate the number of blocks of the portion of the data that is stored by the particular storage device.

For instance, if only Target Device 100 received the data request from the initiator system, but Target Devices 100, 101, 102 and 103 each stores a portion of the requested data, Target Device 100 may utilize scale-out techniques such as data forwarding to fully service the data request. In addition, upon completion of all data transfers, Target Device 100 may provide the initiator system a referral list comprising a plurality of referrals as shown in FIG. 3.

In one embodiment, each referral may inform the initiator of the optimal path for accessing the portion of the requested data (the initial data request) that is stored by a particular data segment. For example, referral 3002 may be generated in response to the initial data request (LBA 0 for 400 blocks) indicating that data segment 201 contains a portion of the requested data (LBA 100 for 100 blocks), and that the optimal path for accessing this portion of data may be through Port 1. Similarly, referral 3004 and 3006 may be generated in response to the same data request indicating the optimal paths for accessing portions of data that are stored on data segment 202 and 203, respectively.

Utilizing data forwarding, the initial data request may be fully serviced by Target Device 100, hence the initiator system may discard the referral list. However, in one embodiment, the initiator system may be configured for generating and maintaining a referral cache based on the referral list. The initiator may thus be encouraged to utilize the referral cache for directing future I/O operations so the penalties associated with data forwarding may be avoided.

Figure 5:
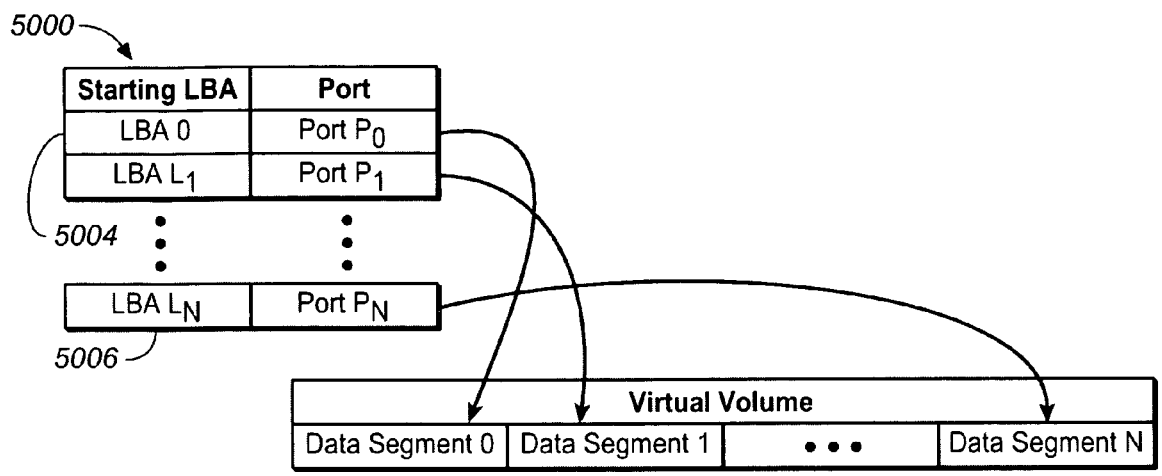
FIG. 5 is an illustration of a referral cache.

Referring to FIG. 5, a referral cache 5000, in accordance with an exemplary embodiment of the present disclosure is shown. When the initiator system receives a referral list, the LBA and the port identifier of each referral contained in the referral list may be obtained and stored in the referral cache 5000 accessible to the initiator system. The referral cache

5000 may be configured and utilized as presented by Zwisler et al, Caching of SCSI I/O Referrals, U.S. patent application Ser. No. 12/383,396 filed Mar. 24, 2009, which is hereby incorporated by reference in its entirety.

As presented by Zwisler et al, each row in the referral cache 5000 may comprise a data segment referral. Each data segment referral may include a starting LBA and a corresponding port identifier for referring to a particular data segment available in the virtual volume. For example, a referred data stored in data segment X of a given virtual volume may start at the virtual volume's LBA $L_x$ and may be accessible through port $P_x$. For instance, in the example illustrated in FIG. 5, row 5004 may store the starting LBA and the port identifier for accessing data segment 0, and row 5006 may store the starting LBA and the port identifier for accessing data segment N.

In one embodiment, the starting LBA for a particular data segment may be determined as the lowest (smallest) offset LBA that the initiator received regarding this particular data segment. For example, if a first referral generated for a first data request indicated a first offset LBA of 120 for data segment 201, and a second referral generated for a second data request indicated a second offset LBA of 100 for data segment 201, then the lowest offset LBA for data segment 201 known to the initiator is LBA 100 (hence LBA 100 may be recorded as the starting LBA for data segment 201). It is understood that the starting LBA for a data segment stored in the referral cache may be updated based on the referral received.

The referral cache may be populated over time based on the referral lists received. For example, a fully populated initiator accessible referral cache 6000 corresponding to the storage cluster of the above example may be depicted in FIG. 6. The initiator systems may utilize the data stored in their corresponding referral caches to direct/route I/O requests. For example, in one embodiment, when an I/O request needs to be transmitted from the initiator system to the block storage cluster, the initiator system may determine a requested LBA specified in the I/O request. The initiator system may locate the greatest starting LBA stored in the referral cache 6000 that is less than the requested LBA. The initiator may then direct the I/O request to the block storage cluster based on the greatest starting LBA and its corresponding port identifier.

For example, in the exemplary configuration described above, if the initiator system issues an I/O request to LBA 150 with length of 50 blocks, the initiator system may correctly direct the I/O request to the appropriate data segment utilizing the data stored in the referral cache 6000. In one embodiment, the initiator system may search in the referral cache 6000 to locate a data segment with the greatest starting LBA that is less than 150 (the requested LBA). In this example, data segment 201 has the greatest starting LBA of 100 that is less than the requested LBA of 150. Therefore, the initiator system may direct the I/O request to data segment 201 through a corresponding port stored in the referral cache 6000, i.e., port 1 in this example.

It is contemplated that the initiator may also utilize information stored in the referral cache to correctly split I/O requests that may span multiple target devices. For example, utilizing the LBA and length specified in a given I/O request, the initiator may calculate whether this given I/O request spans multiple data segments. If the I/O request does span multiple data segments, the initiator may split the I/O request into multiple child I/O requests along the data segment boundaries. Each of the child I/O requests may then be directed to its appropriate data segment as previously described. The initiator may be configured for aggregating the responses received from the child I/O requests and returning status for the original I/O requests as appropriate.

Figure 6:
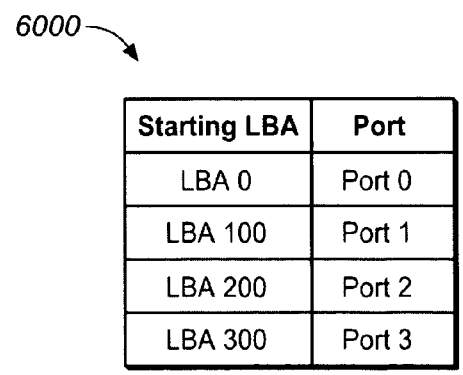
FIG. 6 is an illustration of a populated referral cache.

For example, consider an I/O request to LBA 150 with length of 100 blocks in the same configuration as illustrated in FIG. 6. Since this I/O request accesses LBAs 150 through 249, it spans both data segment 201 and data segment 202. Based on the data stored in the referral cache 6000, the initiator may detect this situation and may split the I/O request along the data segment boundary between segment 201 and 202. For instance, the original I/O request may be split into the following two child I/O requests:

Port 1, LBA 150, Length 50
Port 2, LBA 200, Length 50

Each of these child I/O requests may be performed without any further referral responses. The initiator may be configured to aggregate the responses received from these two child I/O requests and return the aggregated results for the original I/O request.

In another embodiment, a referral may further comprise a referral type as illustrated in FIGS. 2-4. The referral type may indicate whether the portion of the data referred to is provided to the initiator by data forwarding. For example, a "soft" referral type may be utilized to indicate that the portion of the data referred to by this referral is forwarded to the initiator, but the path provided in this referral may be optionally utilized by the initiator to improve future data request efficiency. In another example, a "hard" referral type may be utilized to indicate that the portion of the data referred to by this referral is not forwarded to the initiator, and that the initiator should issue a child data request based on this particular referral to retrieve the portion of the data.

In this configuration, the referral type may indicate whether a child data request is necessary to complete the initial data request. Referring to FIG. 4, there is shown a referral list with two "soft" referrals 4002 and 4004 and one "hard" referral 4006. In this example, referrals 4002 and 4004 indicate that in response to the initial data request (e.g., LBA 0 for 400 blocks), a portion of the data that is stored on data segment starting at LBA 100 for 100 blocks (referral 4002) and another portion of the data that is stored on data segment starting at LBA 200 for 100 blocks (referral 4004) have been retrieved and forwarded to the initiator system. However, referral 4006 in this example is a "hard" referral, thus no data forwarding is provided for this portion of the data, and the initiator may need to issue a child data request to retrieve data from LBA 300 for 100 blocks through port 3.

It is understood that the referral type may not have any effect on the referral cache as previously described. The referral type may be configured to merely indicate whether data forwarding is provided for the portion of the data referred. The referral cache may be generated and maintained as described above without taking the referral type into consideration. It is also understood that any predetermined type assignment may be utilized for referral type configuration. That is, the referral type may not be limited to "soft" and "hard" types.

Figure 7:
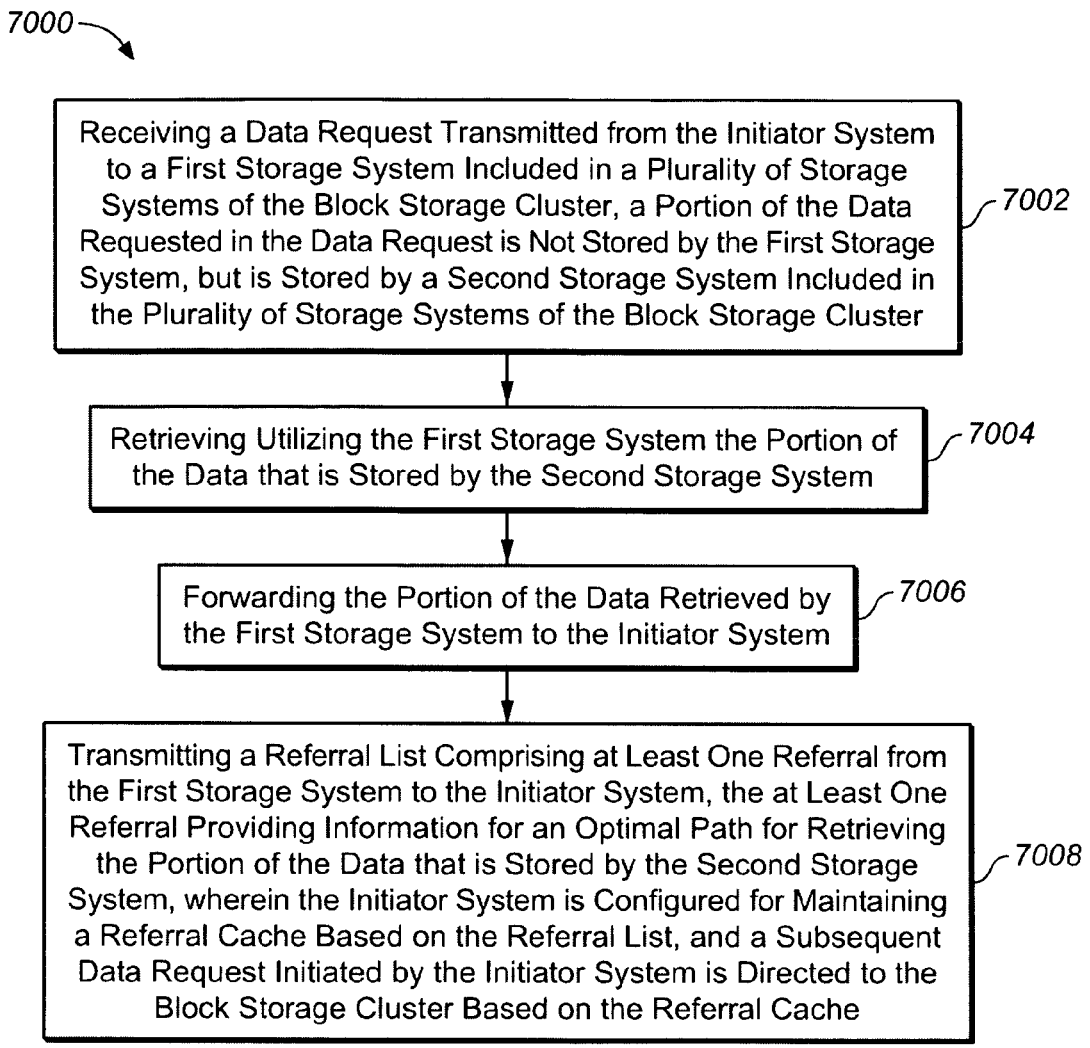
FIG. 7 is a flow chart illustrating a method for providing referrals for Small Computer System Interface (SCSI) Input/Output (I/O) referrals, in accordance with an exemplary embodiment of the present disclosure.

FIG. 7 shows a flow diagram illustrating steps performed by a communication method 7000 in accordance with the present disclosure. The method 7000 may be utilized in a storage system for communication between an initiator system and a block storage cluster. Step 7002 may receive a data request transmitted from the initiator system to a first storage system included in a plurality of storage systems of the block storage cluster. A portion of the data requested in the data request may not be stored by the first storage system, but stored by a second storage system.

In step 7004, the first storage system may retrieve the portion of the data that is stored by the second storage system, and step 7006 may forward the portion of the data retrieved by the first storage system to the initiator system.

Step 7008 may transmit a referral list comprising at least one referral from the first storage system to the initiator system. The referral may provide information for an optimal path for retrieving the portion of the data requested (in the initial data request) that is stored by a storage system different from the first storage system (e.g., the second storage system). The initiator system may process the referral list to generate and maintain a referral cache. Therefore, a subsequent data request initiated by the initiator system may be directed to the block storage cluster based on the referral cache.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for communication between an initiator system and a block storage cluster, comprising:
   receiving an initial data request transmitted from the initiator system to a first storage system included in a plurality of storage systems of the block storage cluster, a portion of the data requested in the initial data request is not stored by the first storage system, but is stored by a second storage system included in the plurality of storage systems of the block storage cluster;
   retrieving utilizing the first storage system the portion of the data that is stored by the second storage system;
   forwarding the portion of the data retrieved by the first storage system to the initiator system; and
   transmitting a referral list comprising at least one referral from the first storage system to the initiator system, the at least one referral providing information for an optimal path for retrieving the portion of the data that is stored by the second storage system,
   wherein the initiator system is configured for maintaining a referral cache based on the referral list, and a subsequent data request initiated by the initiator system is directed to the block storage cluster based on the referral cache.

2. The method as claimed in claim 1, wherein the at least one referral comprises:
   a port indicator indicating a port to be utilized for communication between the initiator system and the second storage system;
   an offset logical block address (LBA) for the portion of the data that is stored by the second storage system; and
   a data block length of the portion of the data that is stored by the second storage system.

3. The method as claimed in claim 2, wherein the at least one referral further comprises:
   a referral type indicating whether a child data request is necessary to complete the initial data request.

4. The method as claimed in claim 2, wherein the referral cache is configured for storing at least one data segment referral, the at least one data segment referral comprising a starting LBA and at least one port identifier.

5. The method as claimed in claim 4, wherein the subsequent data request initiated by the initiator system is directed to the block storage cluster based on the referral cache, further comprising:
   determining a requested LBA specified in the subsequent data request;
   locating within the referral cache a greatest starting LBA that is less than the requested LBA; and
   directing the subsequent data request to the block storage cluster based on the greatest starting LBA and the at least one port identifier corresponding to the greatest starting LBA.

6. The method as claimed in claim 4, wherein the subsequent data request initiated by the initiator system is directed to the block storage cluster based on the referral cache, further comprising:
   determining a requested length specified in the subsequent data request; determining whether the subsequent data request spans more than one data segment;
   splitting the subsequent data request into a plurality of child requests along at least one data segment boundary when the subsequent data request spans more than one data segment; and
   directing each of the plurality of child requests to the block storage cluster based on the plurality of starting LBAs and the plurality of corresponding port identifiers stored in the referral cache.

7. The method as claimed in claim 1, wherein the data request is a Small Computer System Interface (SCSI) command, the first storage system is a SCSI storage system, and the initiator system is a SCSI initiator system.

8. A storage system, comprising:
   means for receiving an initial data request transmitted from the initiator system to a first storage system included in a plurality of storage systems of the block storage cluster, a portion of the data requested in the initial data request is not stored by the first storage system, but is stored by a second storage system included in the plurality of storage systems of the block storage cluster;

means for retrieving utilizing the first storage system the portion of the data that is stored by the second storage system;

means for forwarding the portion of the data retrieved by the first storage system to the initiator system; and means for transmitting a referral list comprising at least one referral from the first storage system to the initiator system, the at least one referral providing information for an optimal path for retrieving the portion of the data that is stored by the second storage system, wherein the initiator system is configured for maintaining a referral cache based on the referral list, and a subsequent data request initiated by the initiator system is directed to the block storage cluster based on the referral cache.

9. The storage system as claimed in claim 8, wherein the at least one referral comprises:

a port indicator indicating a port to be utilized for communication between the initiator system and the second storage system;

an offset logical block address (LBA) for the portion of the data that is stored by the second storage system; and a data block length of the portion of the data that is stored by the second storage system.

10. The storage system as claimed in claim 9, wherein the at least one referral further comprises:

a referral type indicating whether a child data request is necessary to complete the initial data request.

11. The storage system as claimed in claim 9, wherein the referral cache is configured for storing at least one data segment referral, the at least one data segment referral comprising a starting LBA and at least one port identifier.

12. The storage system as claimed in claim 11, wherein the subsequent data request initiated by the initiator system is directed to the block storage cluster based on the referral cache, further comprising:

means for determining a requested LBA specified in the subsequent data request;

means for locating within the referral cache a greatest starting LBA that is less than the requested LBA; and means for directing the subsequent data request to the block storage cluster based on the greatest starting LBA and the at least one port identifier corresponding to the greatest starting LBA.

13. The storage system as claimed in claim 11, wherein the subsequent data request initiated by the initiator system is directed to the block storage cluster based on the referral cache, further comprising:

means for determining a requested length specified in the subsequent data request; means for determining whether the subsequent data request spans more than one data segment;

means for splitting the subsequent data request into a plurality of child requests along at least one data segment boundary when the subsequent data request spans more than one data segment; and means for directing each of the plurality of child requests to the block storage cluster based on the plurality of starting LBAs and the plurality of corresponding port identifiers stored in the referral cache.

14. The storage system as claimed in claim 8, wherein the data request is a Small Computer System Interface (SCSI) command, the first storage system is a SCSI storage system, and the initiator system is a SCSI initiator system.

15. A computer-readable storage medium having computer-executable instructions for performing a method for communication between an initiator system and a block storage cluster, said method comprising:

receiving an initial data request transmitted from the initiator system to a first storage system included in a plurality of storage systems of the block storage cluster, a portion of the data requested in the initial data request is not stored by the first storage system, but is stored by a second storage system included in the plurality of storage systems of the block storage cluster;

retrieving utilizing the first storage system the portion of the data that is stored by the second storage system;

forwarding the portion of the data retrieved by the first storage system to the initiator system; and transmitting a referral list comprising at least one referral from the first storage system to the initiator system, the at least one referral providing information for an optimal path for retrieving the portion of the data that is stored by the second storage system, wherein the initiator system is configured for maintaining a referral cache based on the referral list, and a subsequent data request initiated by the initiator system is directed to the block storage cluster based on the referral cache.

16. The computer-readable storage medium as claimed in claim 15, wherein the at least one referral comprises:

a port indicator indicating a port to be utilized for communication between the initiator system and the second storage system;

an offset logical block address (LBA) for the portion of the data that is stored by the second storage system; and a data block length of the portion of the data that is stored by the second storage system.

17. The computer-readable storage medium as claimed in claim 16, wherein the at least one referral further comprises:

a referral type indicating whether a child data request is necessary to complete the initial data request.

18. The computer-readable storage medium as claimed in claim 16, wherein the referral cache is configured for storing at least one data segment referral, the at least one data segment referral comprising a starting LBA and at least one port identifier.

19. The computer-readable storage medium as claimed in claim 18, wherein the subsequent data request initiated by the initiator system is directed to the block storage cluster based on the referral cache, further comprising:

determining a requested LBA specified in the subsequent data request;

locating within the referral cache a greatest starting LBA that is less than the requested LBA; and directing the subsequent data request to the block storage cluster based on the greatest starting LBA and the at least one port identifier corresponding to the greatest starting LBA.

20. The computer-readable storage medium as claimed in claim 18, wherein the subsequent data request initiated by the initiator system is directed to the block storage cluster based on the referral cache, further comprising:

determining a requested length specified in the subsequent data request;

determining whether the subsequent data request spans more than one data segment;

splitting the subsequent data request into a plurality of child requests along at least one data segment boundary when the subsequent data request spans more than one data segment; and directing each of the plurality of child requests to the block storage cluster based on the plurality of starting LBAs and the plurality of corresponding port identifiers stored in the referral cache.

* * * * *